(12) United States Patent
Uchida et al.

(10) Patent No.: US 10,997,398 B2
(45) Date of Patent: May 4, 2021

(54) INFORMATION PROCESSING APPARATUS, AUTHENTICATION SYSTEM, METHOD OF CONTROLLING SAME, AND MEDIUM

(71) Applicant: CANON KABUSHIKI KAISHA, Tokyo (JP)

(72) Inventors: Yumiko Uchida, Kawasaki (JP); Hirotaka Shiiyama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 52 days.

(21) Appl. No.: 16/577,325

(22) Filed: Sep. 20, 2019

(65) Prior Publication Data

US 2020/0104577 A1    Apr. 2, 2020

(30) Foreign Application Priority Data

Sep. 27, 2018   (JP) .............................. JP2018-182700

(51) Int. Cl.
*G06K 9/00*   (2006.01)

(52) U.S. Cl.
CPC ..... *G06K 9/00288* (2013.01); *G06K 9/00255* (2013.01); *G06K 9/00268* (2013.01)

(58) Field of Classification Search
CPC ........... G06K 9/00288; G06K 9/00255; G06K 9/00268
See application file for complete search history.

(56) References Cited

U.S. PATENT DOCUMENTS

2009/0226029 A1*  9/2009  Shimano ................... G06T 7/33
                                                                    382/100
2013/0329970 A1* 12/2013  Irie ..................... G06K 9/00288
                                                                    382/118

(Continued)

FOREIGN PATENT DOCUMENTS

JP          2002373332 A      12/2002
JP          2013153304 A       8/2013

(Continued)

OTHER PUBLICATIONS

Viola "Rapid Object Detection using a Boosted Cascade of Simple Features" Accepted Conference on Computer Vision and Pattern Recognition. 2001, pp. 1-9. Cited in the specification.

(Continued)

*Primary Examiner* — Md K Talukder
(74) *Attorney, Agent, or Firm* — Rossi, Kimms & McDowell LLP

(57) ABSTRACT

An information processing apparatus generates authentication data that can be used for authentication of a first object that is included in a captured image captured by a first image capturing apparatus and has been authenticated by a first authentication apparatus corresponding to the first image capturing apparatus; and causes the authentication data to be reflected to an authentication database (DB) of at least one authentication apparatus included in a plurality of authentication apparatuses. The apparatus generates second authentication data corresponding to a second capturing condition differing from a first capturing condition corresponding to first authentication data that is included in the authentication DB of the first authentication apparatus and was used when authenticating the first object.

20 Claims, 10 Drawing Sheets

(56) References Cited

U.S. PATENT DOCUMENTS

| | | | |
|---|---|---|---|
| 2015/0033309 A1* | 1/2015 | Fujiwara | H04L 63/0861 |
| | | | 726/7 |
| 2017/0351906 A1* | 12/2017 | Oguchi | G06F 3/04817 |
| 2018/0181737 A1* | 6/2018 | Tussy | G06K 9/00335 |
| 2020/0159908 A1* | 5/2020 | Okuyama | G06F 21/45 |
| 2020/0175261 A1* | 6/2020 | Shimizu | G06F 21/32 |
| 2020/0364444 A1* | 11/2020 | Kanaoka | G06K 9/00281 |
| 2020/0380280 A1* | 12/2020 | Kaede | G06K 9/00288 |
| 2020/0401857 A1* | 12/2020 | Lu | G06K 9/00926 |

FOREIGN PATENT DOCUMENTS

| | | |
|---|---|---|
| JP | 2016038774 A | 3/2016 |
| JP | 2016127563 A | 7/2016 |

OTHER PUBLICATIONS

Murphy-Chutorian "Head Pose Estimation for Driver Assistance Systems: A Robust Algorithm and Experimental Evaluation." IEEE Intelligent Transportation Systems Conference. 2007, pp. 709-714. Cited in the specification.

\* cited by examiner

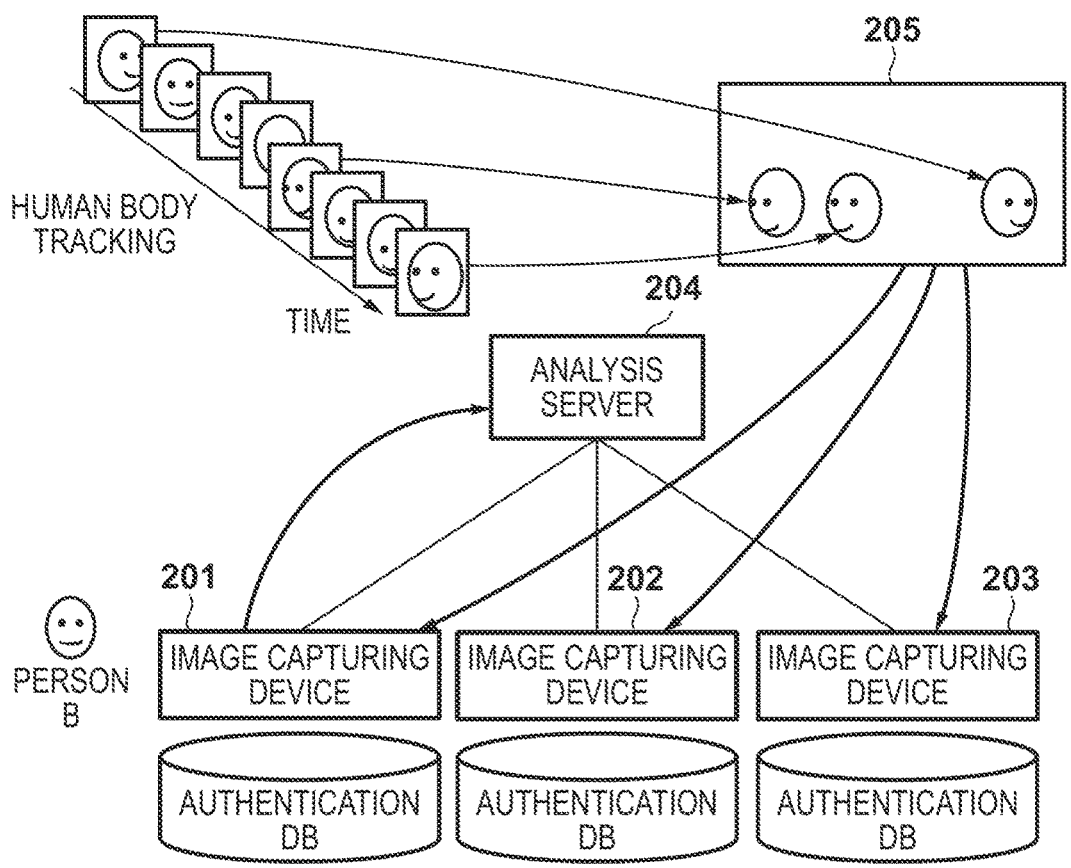

FIG. 3A

| OBJECT ID | FEATURE AMOUNT (DIRECTION 1) | FEATURE AMOUNT (DIRECTION 2) | ... |
|---|---|---|---|
| Object001 | xxx | | |
| Object002 | xxx | xxx | |
| : | : | : | : |

FIG. 3B

| GROUP ID | CAMERA ID |
|---|---|
| Group001 | Camera001 |
| Group001 | Camera002 |
| : | : |

FIG. 3C

| GROUP ID | OBJECT ID | DIRECTION 1 | DIRECTION 2 | ... |
|---|---|---|---|---|
| Group001 | Object001 | ○ | × | |
| Group002 | Object002 | ○ | ○ | |
| Group003 | : | : | : | : |

FIG. 3D

| OBJECT ID | UPDATE TYPE | DIRECTION | FEATURE AMOUNT |
|---|---|---|---|
| Object001 | DELETE | DIRECTION 1 | |
| Object001 | ADD | DIRECTION 2 | xxx |
| : | | | : |

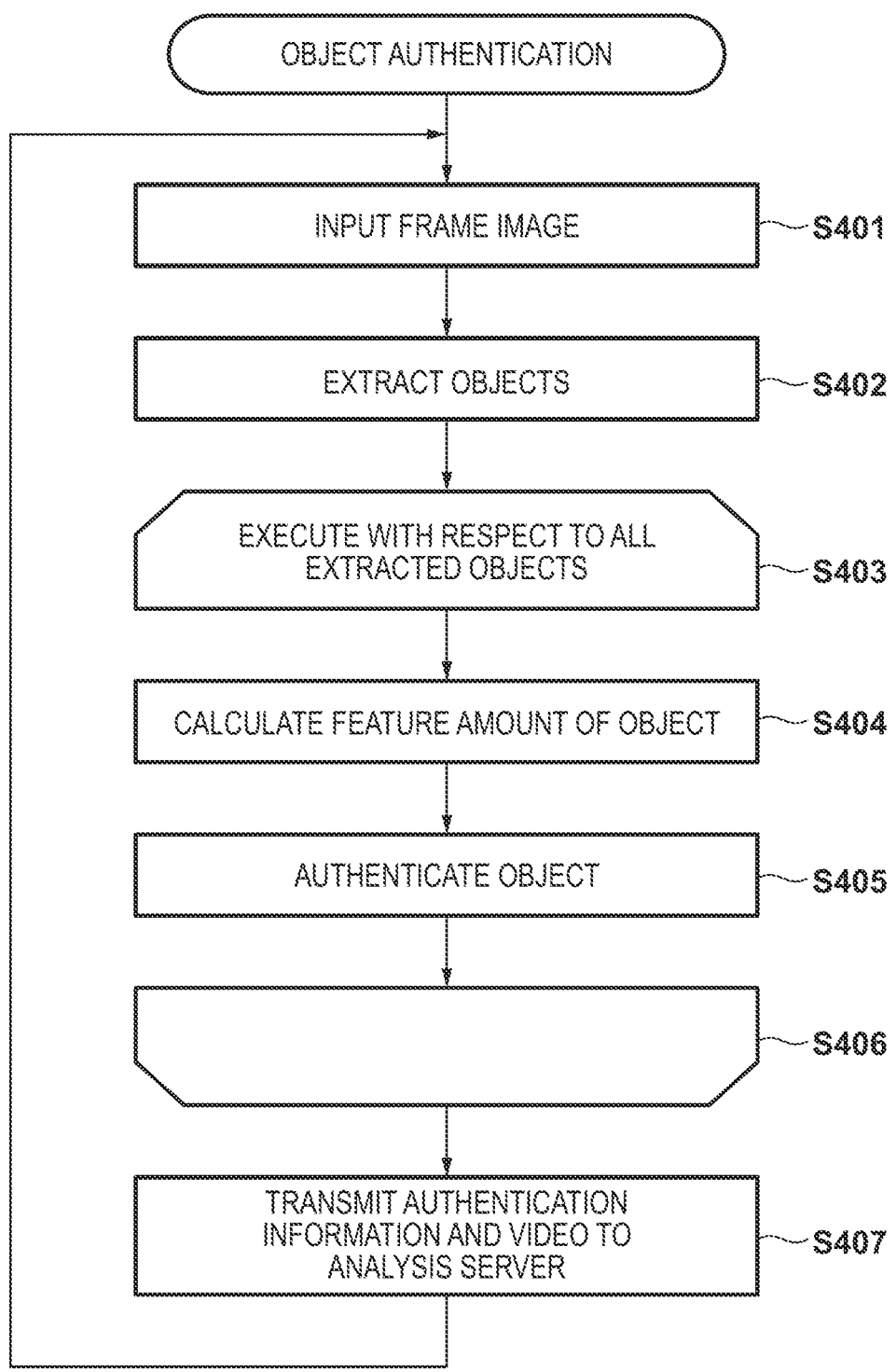

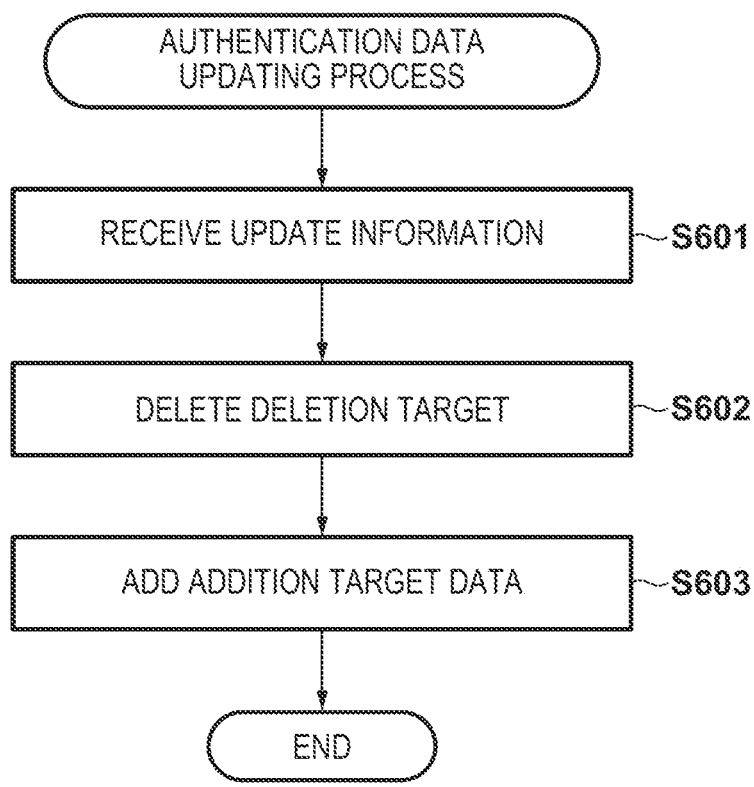

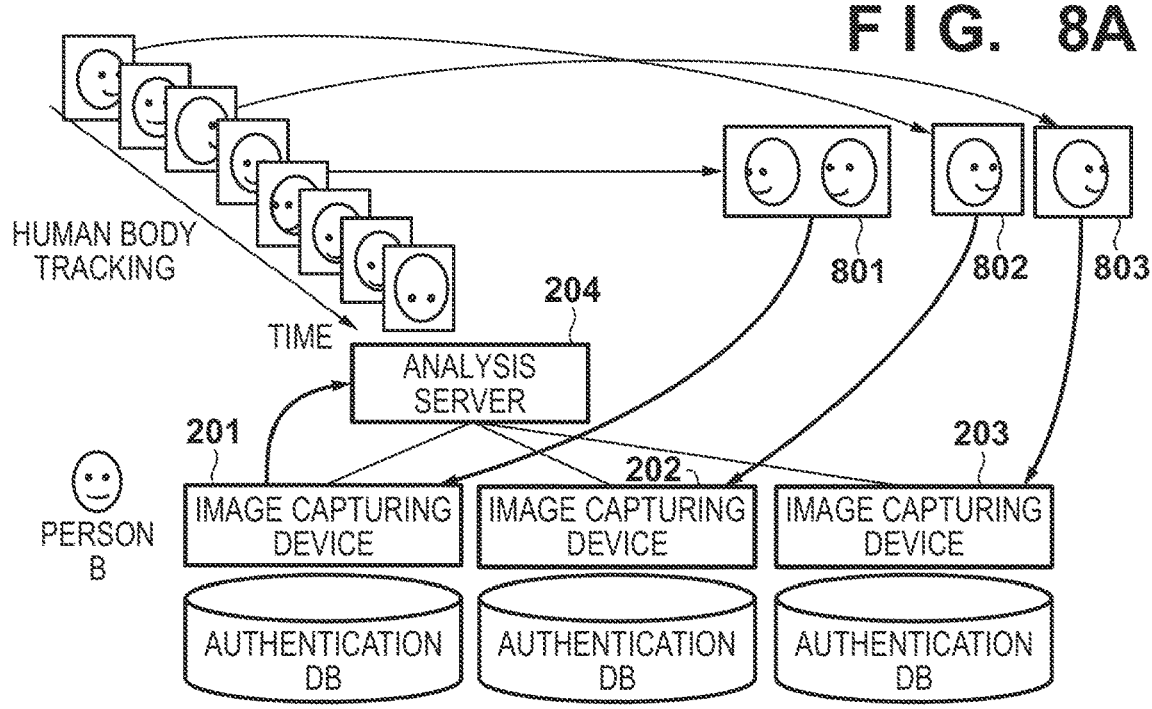

FIG. 9A

| CAMERA ID 304 | OBJECT ID 307 | DIRECTION 1 | DIRECTION 2 | ... |
|---|---|---|---|---|
| Camera001 | Object001 | ○ | ○ | |
| Camera001 | Object002 | × | ○ | |
| Camera002 | ⋮ | ⋮ | ⋮ | ⋮ |

| CAMERA ID 304 | PERIOD 901 | FREQUENCY (DIRECTION 1) | FREQUENCY (DIRECTION 2) | ... |
|---|---|---|---|---|
| Camera001 | 2016/11/15-11/30 | 10 | 3 | |
| Camera001 | 2016/11/30-12/5 | 5 | 3 | |
| ⋮ | | | | |

902

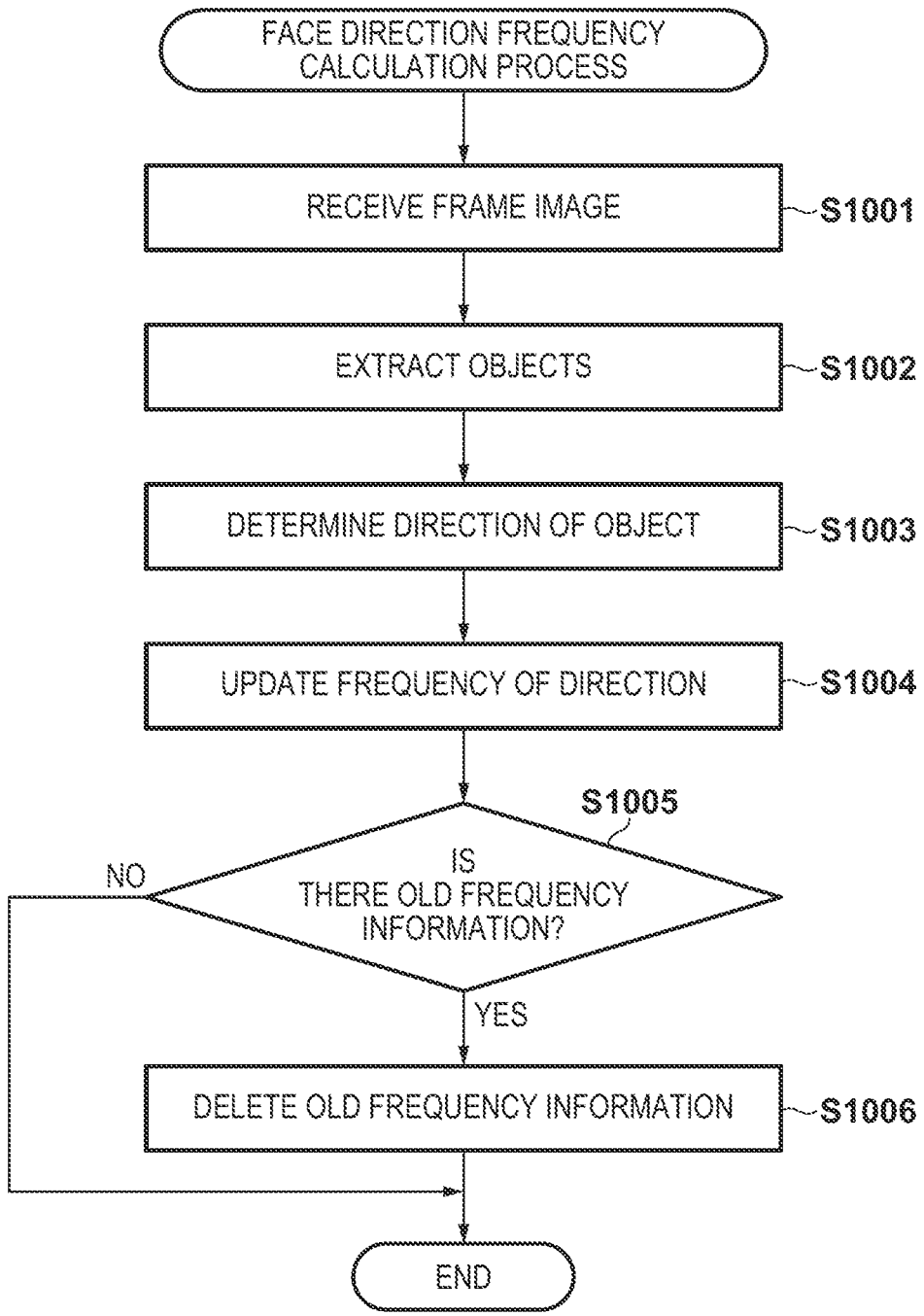

INFORMATION PROCESSING APPARATUS, AUTHENTICATION SYSTEM, METHOD OF CONTROLLING SAME, AND MEDIUM

BACKGROUND OF THE INVENTION

Field of the Invention

The present invention relates to a technique for managing authentication data in an authentication system for authenticating an object in a video.

Description of the Related Art

In recent years, practical use of systems for performing face authentication using video of a surveillance camera has been developing. It is possible to use such a system for a swift arrest or prevention of a crime by authenticating the face of a wanted person or a shoplifter. In addition, in an event site or the like, by authenticating the face of an important person to ascertain their location, it is possible to smoothly conduct event operations and the movement and placement of security guards.

In the face authentication, a face image registered in advance for a person to be authenticated is compared with a face image of a person in an actually captured video, and it is determined whether or not they are the same person. Accordingly, if the face direction of authentication data (a feature amount or the like) registered in advance differs from a face direction actually captured, there is a problem that the authentication accuracy decreases. However, if face direction variation of the authentication data is increased in order to perform face authentication with high accuracy, there is a problem that the load of the comparing processing becomes high.

Therefore, a technique has been proposed in which authentication data is shared by a plurality of cameras. Japanese Patent Laid-Open No. 2013-153304 (Patent Literature (PTL) 1) discloses a technique for transmitting feature amounts and face images of a person authenticated by a certain monitoring apparatus to another monitoring apparatus. Japanese Patent Laid-Open No. 2016-127563 (PTL 2) discloses a technique of transmitting external feature information (colors of clothes, shapes of belongings, and the like) of a person authenticated by a certain surveillance camera to another surveillance camera. Japanese Patent Laid-Open No. 2016-38774 (PTL 3) discloses a technique of, when a feature amount of a person in a video matches a feature amount of a person registered in advance, specifying a feature amount (face direction, expression) not registered in a DB for each installation condition and adding the feature amount to the DB.

However, in the conventional technique described above, only a feature amount of a face image that has been successfully authenticated is transmitted to another apparatus. In other words, only a feature amount of a face that depends on a direction in which an image was captured is added to authentication data, and it is not possible to add a feature amount of a face direction that is greatly separated from the original authentication data. Therefore, improvement of authentication accuracy is limited.

SUMMARY OF THE INVENTION

According to one aspect of the present invention, an information processing apparatus operable to connect via a network to a plurality of authentication apparatuses corresponding to a plurality of image capturing apparatuses, the information processing apparatus comprises: an authentication data generation unit configured to generate authentication data that can be used for authentication of a first object that is included in a captured image captured by a first image capturing apparatus included in the plurality of image capturing apparatuses and has been authenticated by a first authentication apparatus corresponding to the first image capturing apparatus; and a reflection unit configured to cause the authentication data generated by the authentication data generation unit to be reflected to an authentication database (DB) of at least one authentication apparatus included in the plurality of authentication apparatuses, wherein the authentication data generation unit generates second authentication data corresponding to a second capturing condition differing from a first capturing condition corresponding to first authentication data that is included in the authentication DB of the first authentication apparatus and was used when authenticating the first object.

According to another aspect of the present invention, an information processing apparatus communicably connected to a plurality of image capturing apparatuses via a network, comprises: an authentication data generation unit configured to generate authentication data that can be used for authentication of an object that is included in a captured image captured by a first image capturing apparatus included in the plurality of image capturing apparatuses and is authenticated by a first authentication unit that the first image capturing apparatus has; and a reflection unit configured to cause the authentication data generated by the authentication data generation unit to be reflected to an authentication database that stores the authentication data and is a storage unit held by at least one image capturing apparatus included in the plurality of image capturing apparatuses and different to the first image capturing apparatus, wherein the authentication data generation unit generates second authentication data corresponding to a second condition different from a first condition corresponding to first authentication data that has been registered in the authentication database of the first image capturing apparatus and was used when authenticating the object.

The present invention makes it possible to improve authentication accuracy more efficiently.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 2A to 2C are views illustrating an outline of an authentication data updating process according to the first embodiment.

FIGS. 3A to 3D are views for explaining various data used in an authentication system.

FIG. 4 is a flow chart of an object authentication process.

FIG. 6 is a flow chart of an authentication data updating process.

FIGS. 8A to 8E are views illustrating an outline of an authentication data updating process according to the second embodiment.

FIGS. 9A and 9B are views for explaining various data used in an authentication system.

FIG. 10 is a flow chart of a face direction frequency calculation process.

DESCRIPTION OF THE EMBODIMENTS

Hereinafter, an example of embodiments of the present invention will be described in detail with reference to the drawings. The following embodiments are merely illustrative, and are not intended to limit the scope of the present invention.

First Embodiment

As a first embodiment of an image processing apparatus according to the present invention, description is given below by taking as an example an authentication system for authenticating a person (an object) in a video by a face image.

<System Configuration>

The authentication system according to the first embodiment includes a plurality of image capturing devices 118, and an analysis server 119 that processes data transmitted from the image capturing devices and generates update information for authentication data.

Figure 1A:
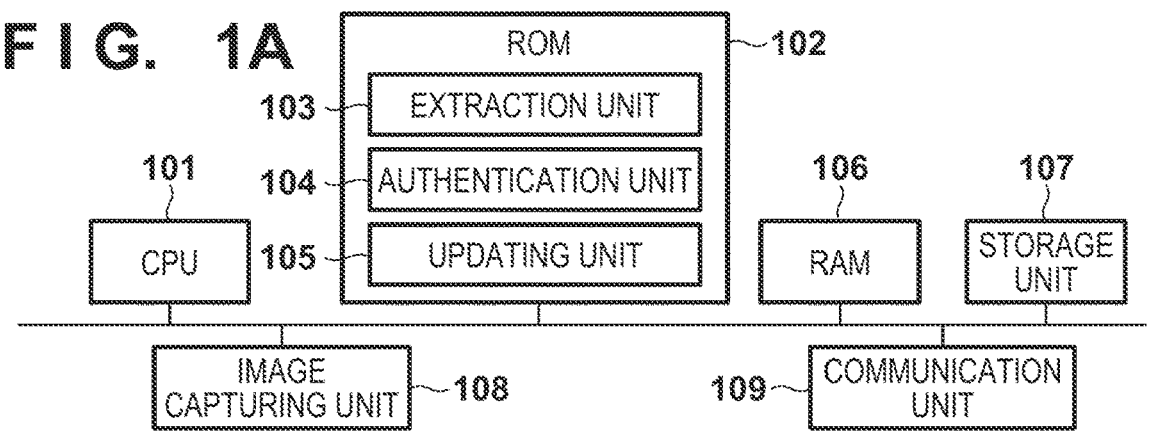
FIGS. 1A to 1C are views illustrating a configuration of apparatuses included in an authentication system according to a first embodiment.
Figure 1B:
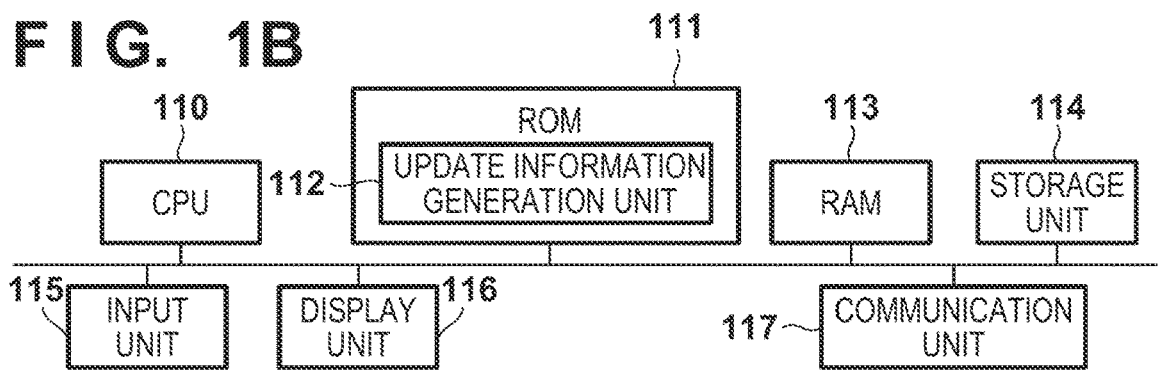
Figure 1C:
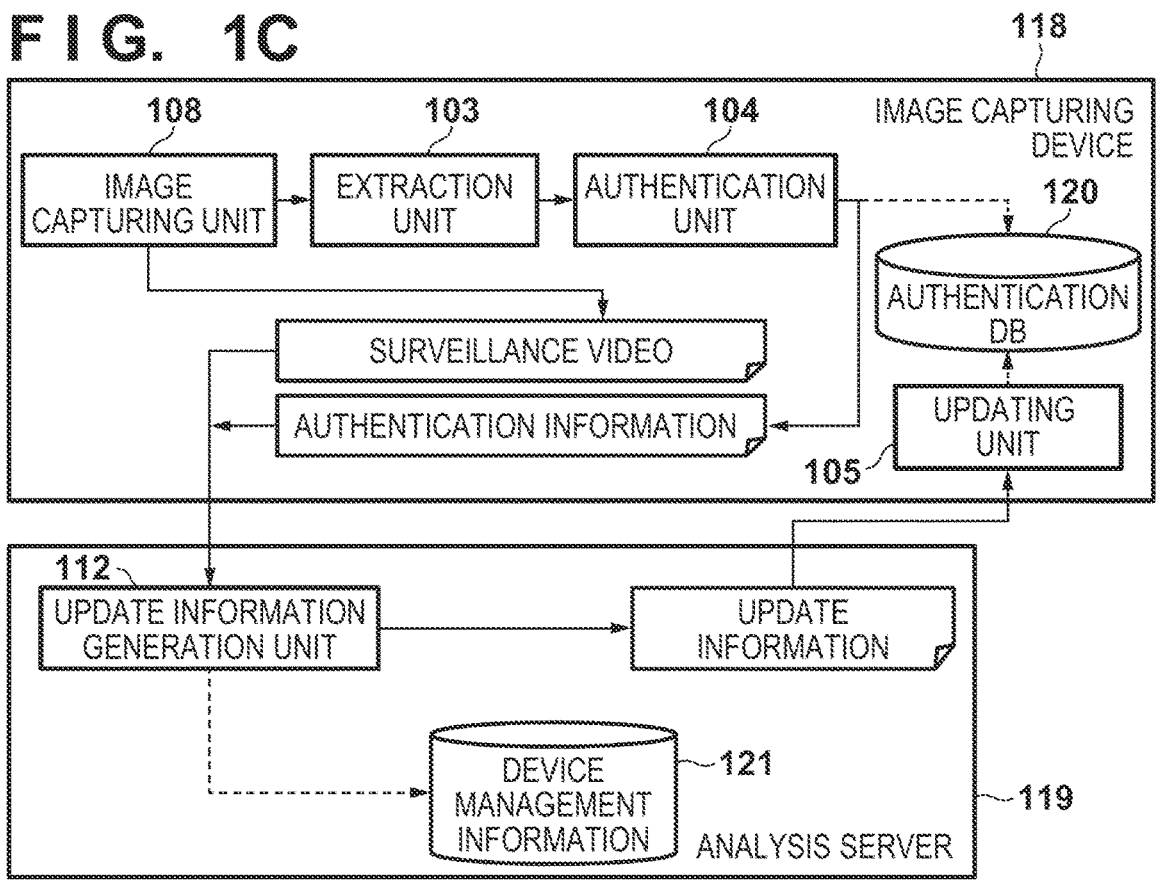

FIGS. 1A to 1C are views illustrating a configuration of apparatuses included in the authentication system according to the first embodiment. FIG. 1A illustrates a hardware configuration of an image capturing device 118, and FIG. 1B illustrates a hardware configuration of the analysis server 119. FIG. 1C illustrates the software configuration of the image capturing device 18 and the software configuration of the analysis server 119.

The image capturing device 118 includes a CPU 101, a ROM 102, a RAM 106, a storage unit 107, an image capturing unit 108, and a communication unit 109. The ROM 102 stores control programs for realizing an extraction unit 103, an authentication unit 104, and an updating unit 105, which will be described later.

The CPU 101 executes control programs stored in the ROM 102 to control the entire image capturing device 118. The RAM 106 temporarily stores various data, which will be described later. The RAM 106 is also used as a work area of the CPU 101.

The storage unit 107 stores an authentication database (DB) 120 that stores one or more pieces of authentication data (for example, feature amounts of face images) that are used for authentication processing. As a medium of the storage unit 107, a flash memory, an HDD, a DVD, or the like can be used. The image capturing unit 108 is a functional unit for capturing a given image capturing range and generating a video which is a captured image. The video generated by the image capturing unit 108 is analyzed by the CPU 101 which executes control programs. The communication unit 109 is a functional unit for communicating with an external apparatus such as the analysis server 119. The communication unit 109 may have a wired connection or a wireless connection. In addition, a configuration may be employed in which communication with an external apparatus is performed via a network such as the Internet. The video obtained by the image capturing unit 108 and the authentication information calculated by the authentication unit 104 are transmitted to the analysis server 119 via the communication unit 109.

The extraction unit 103 analyzes the video obtained by the image capturing unit 108, and extracts an object appearing in the video. The object may be a person, a face region of a person, an animal, a physical object, or the like. Here, description is given by envisioning a face region of a person as an object. The authentication unit 104 authenticates an object by referring to the authentication DB 120. Here, it is assumed that feature amounts of a face image of a person to be authenticated are stored in the authentication DB 120. The updating unit 105 receives the update information from the analysis server 119, and updates the authentication data stored in the authentication DB 120.

The analysis server 119 is an information processing apparatus that includes a CPU 110, a ROM 111, a RAM 113, a storage unit 114, an input unit 115, a display unit 116, and a communication unit 117. The ROM 111 stores a control program for realizing an update information generation unit 112, which will be described later.

The CPU 110 executes control programs stored in the ROM 111 to thereby control the entirety of the analysis server 119. The RAM 113 temporarily stores various data, which will be described later. The RAM 113 is also used as a work area of the CPU 110.

The storage unit 114 stores the video received from the image capturing device 118 and device management information 121 for managing the image capturing device 118. As a medium of the storage unit 114, a flash memory, an HDD, a DVD, or the like can be used. The input unit 115 is configured by operation buttons, a touch panel, and the like, and is a functional unit that accepts an instruction from a user. The display unit 116 is configured by a liquid crystal panel or the like, and is a functional unit that displays data to be processed and processing results. The communication unit 117 is a functional unit for communicating with an external apparatus such as the image capturing device 118. The update information generated by the update information generation unit 112 is transmitted to each image capturing device 118 via the communication unit 117.

The update information generation unit 112 analyzes the data received from the image capturing device 118, and generates update information for authentication data that can be used to authenticate the object. More specifically, the update information generation unit 112 refers to the device management information 121, determines an object feature amount to be added to the authentication DB 120 of each image capturing device 118, and generates the object feature amount as update information. The device management information 121 is information for managing information relating to the authentication DB 120 of each image capturing device 118.

Here, it is assumed that each functional unit illustrated in FIG. 1C is realized by the CPU executing the control programs, but configuration may be taken to realize one or more functional units by hardware such as electronic circuits.

<Overview of Authentication Data Updating Process>

FIG. 2A is a view illustrating an outline of an authentication data updating process according to the first embodiment. Here, a state where a system is configured by three image capturing devices 201 to 203 installed nearby and one analysis server 204 is envisioned. For example, the image capturing devices 201 to 203 are set along a path, and there is a high possibility that the same person will be captured thereby at a different times.

FIG. 2B and FIG. 2C are diagrams exemplarily illustrating authentication data in the authentication DBs used by the image capturing devices 201 to 203. In the first embodiment, it is assumed that the three image capturing devices 201 to 203 have a common authentication DB in their respective apparatuses.

FIG. 2B illustrates an initial state of the authentication DB, and FIG. 2C illustrates a state of the authentication DB after time has elapsed from the start of the operation. In the authentication DB, feature amounts of face regions of target persons (a wanted person or an important person) are stored. In particular, here, feature amounts are managed for each person and each face direction. In the initial state, feature amounts of limited face directions are stored, and in this example, the feature amounts of the front faces of a person A, a person B, and a person C are stored as the feature amounts 206 to 208. As described above, since face authentication is greatly influenced by face direction, in the initial state, it is difficult to authenticate a person captured when the direction of the face is other than the front.

In FIG. 2A, a case where the image capturing devices 201 captures the person B and authenticates the front face of the person B is considered. The image capturing device 201 transmits the authentication information of the person B to the analysis server 204. The analysis server 204 obtains a feature amount of a face direction different from that at the time of authentication for the person B. In this case, feature amounts of face directions other than the front face are obtained from a series of data (a person track) obtained by tracking the authenticated person B. Then, the analysis server 204 generates update information 205 for updating the authentication data of the person B.

The analysis server 204 transmits the generated update information to the image capturing device 201 and the image capturing devices 202 and 203 which are installed in the vicinity of the image capturing device 201. Each of the image capturing devices 201 to 203 receives the update information, and adds the feature amount to the authentication DB in each apparatus in accordance with the update information.

FIG. 2C illustrates the state of the authentication DBs after the update information has been reflected. A feature amount 209 and a feature amount 210 which do not exist in the initial state (FIG. 2B) have been added for the person B. That is, even when the image capturing devices 201 to 203 perform capturing with a face direction different from the face direction registered in the initial state, the authentication of the person B can be performed more suitably. In particular, the authentication data can be efficiently expanded for the person B who is highly likely to be captured at a different times by the image capturing devices 202 and 203, which are installed in the vicinity of the image capturing device 201.

Here, although description is given assuming that feature amounts are managed for each face direction, feature amounts may be managed based on a difference in capturing conditions other than the face direction. As an example, differences in face expressions, accessories (glasses, sunglasses, masks, hats, etc.), and illumination conditions (color, angle, lightness, etc.) may be used. In this case, it is possible to improve the authentication accuracy in the case where capturing is performed with an expression and illumination condition that are different to an expression and illumination condition registered in the initial state. An object to be authenticated is not limited to a person, and may be applied to an animal, a physical object, or the like. In this case, the feature amount may be managed based on the difference between a capturing direction of a physical object (direction from which physical object was captured) and the appearance of the physical object.

FIGS. 3A to 3D are views for explaining various data used in an authentication system. FIG. 3A is authentication data stored in the authentication DB 120 of the image capturing device, and is data that corresponds to FIG. 2B and FIG. 2C. The authentication data stores feature amounts of face regions of persons to be authenticated, and it is possible to uniquely specify a person by an object ID 301. In addition, configuration is such that feature amounts of a plurality of face directions can be managed for one person to be authenticated, and the feature amounts 302 are recorded for each face direction. As a variation of the face direction, for example, it is possible to perform management by ranges obtained by dividing each of a left-right direction and an up-and-down direction by a predetermined angle (for example, 30 degrees).

FIG. 3B and FIG. 3C are data stored in the device management information 121 of the analysis server. FIG. 3B is management data for grouping a plurality of image capturing devices. For example, image capturing devices can be grouped in units of the same facility, the same city, or the like. That is, a certain image capturing device is grouped with another image capturing device having a high possibility of, in the future, capturing a person captured by the certain image capturing device. Here, the management data is configured as a table including a plurality of records in which a group ID 303 for specifying a group and a camera ID 304 for specifying an image capturing device belonging to the group are set.

FIG. 3C is information for managing the authentication DB 120 in an image capturing device. As described above, in the first embodiment, the authentication DBs are common to the same group. Therefore, for each group ID 303, it is managed, for each object ID 301, what direction a feature amount recorded in the authentication DB 120 corresponds to. In the example of FIG. 3C, whether or not a feature amount has been recorded to the authentication DB 120 is managed as a table for a plurality of directions 305 (direction 1 and direction 2). Here, "○" indicates that a feature amount has been recorded, and "x" indicates that a feature amount has not been recorded.

FIG. 3D exemplarily illustrates data of the update information 205. As described above, the update information 205 is data that is generated by the update information generation unit 112 of the analysis server, and transmitted to the image capturing device. The update information 205 stores an object ID 301, an update type 306, a direction 307, and a feature amount 308. The update type 306 indicates the type of update for the authentication DB 120, and either "add" or "delete" is designated.

"add" is designated when adding data expanded by the analysis server 119 to the authentication data in the authentication DB 120. In contrast, "delete" is designated when deleting authentication data that has already been stored in the authentication DB 120. For example, this is used in a case of deleting authentication data having a low priority from the authentication DB 120.

The direction 307 is identification information for a face direction, and designates the face direction of the data that is to be added to or deleted from the authentication data. The feature amount 308 is a feature amount of the face region, and is recorded only when the update type 306 is "add".

<Detailed Operation of Each Apparatus>

Hereinafter, an object authentication process in the image capturing device, an authentication data expansion process in the analysis server, and an authentication data updating process in the image capturing device will be described in more detail.

FIG. 4 is a flow chart of an object authentication process. This processing is executed by the extraction unit 103 and the authentication unit 104 of the image capturing device 118. For example, the processing is repeatedly performed at intervals at which frame images are received.

In step S401, the extraction unit 103 receives a frame image of a captured video from the image capturing unit 108. In step S402, the extraction unit 103 extracts objects to be authenticated. As described above, here, since an object to be authenticated is a face region of a person, face regions are extracted in step S402. As a method of extracting face regions of persons from an image, for example, a technique disclosed in "P. Viola, M. Jones, "Rapid Object Detection Using a Boosted Cascade of Simple Features", Computer Vision and Pattern Recognition, 2001" (hereinafter referred to as Non-Patent Literature (NPL) 1) can be used. In the technique of NPL 1, a luminance difference of a local region specific to a face region is learned in advance by using a large number of face images. Then, the input image is searched by search windows, and the luminance difference between respective search windows is compared with training data to determine whether or not there is a face region.

In the subsequent step S403 to step S406, the authentication unit 104 performs authentication processing on an object extracted in step S402. In step S404, the authentication unit 104 calculates an extracted object feature amount. To calculate a feature amount of the face region, organ points such as eyes and a mouth in the face image of the person are obtained, and a SIFT (Scale Invariant Feature Transform) feature amount of the organ points can be used. This feature amount is an example, and other feature amounts may be used.

In step S405, the authentication unit 104 authenticates the object using the feature amount calculated in step S404. Here, it is determined whether or not the feature amount calculated in step S404 is the same as a feature amount (authentication data) of any important person registered in the authentication DB 120. Specifically, the feature amount calculated in step S404 is compared with the authentication data included in the authentication DB 120. If there is a feature amount whose similarity is higher than the predetermined threshold value, a determination of being the same person is made. In calculating the similarity, configuration may be taken to use a result of obtaining and normalizing a sum of distances of SIFT feature amounts of each organ point. Of course, in order to be robust with respect for support for occlusion or the like, the sum of distances, except for those with the largest distance, may be obtained and normalized to calculate similarity.

In step S407, the authentication unit 104 transmits the authentication information and the frame image to the analysis server 119. The authentication information is a position of the authenticated object in the image, an object ID of the authenticated object, and the camera ID. Configuration may be taken to, in order to prevent processing in the analysis server 119 from being repeatedly performed when the same person is successively authenticated by a plurality of frame images, transmit the authentication information of the same person only once within a predetermined time. That is, by not repeatedly transmitting the authentication information of the same person, the processing load on the analysis server 119 can be reduced.

Figure 5:
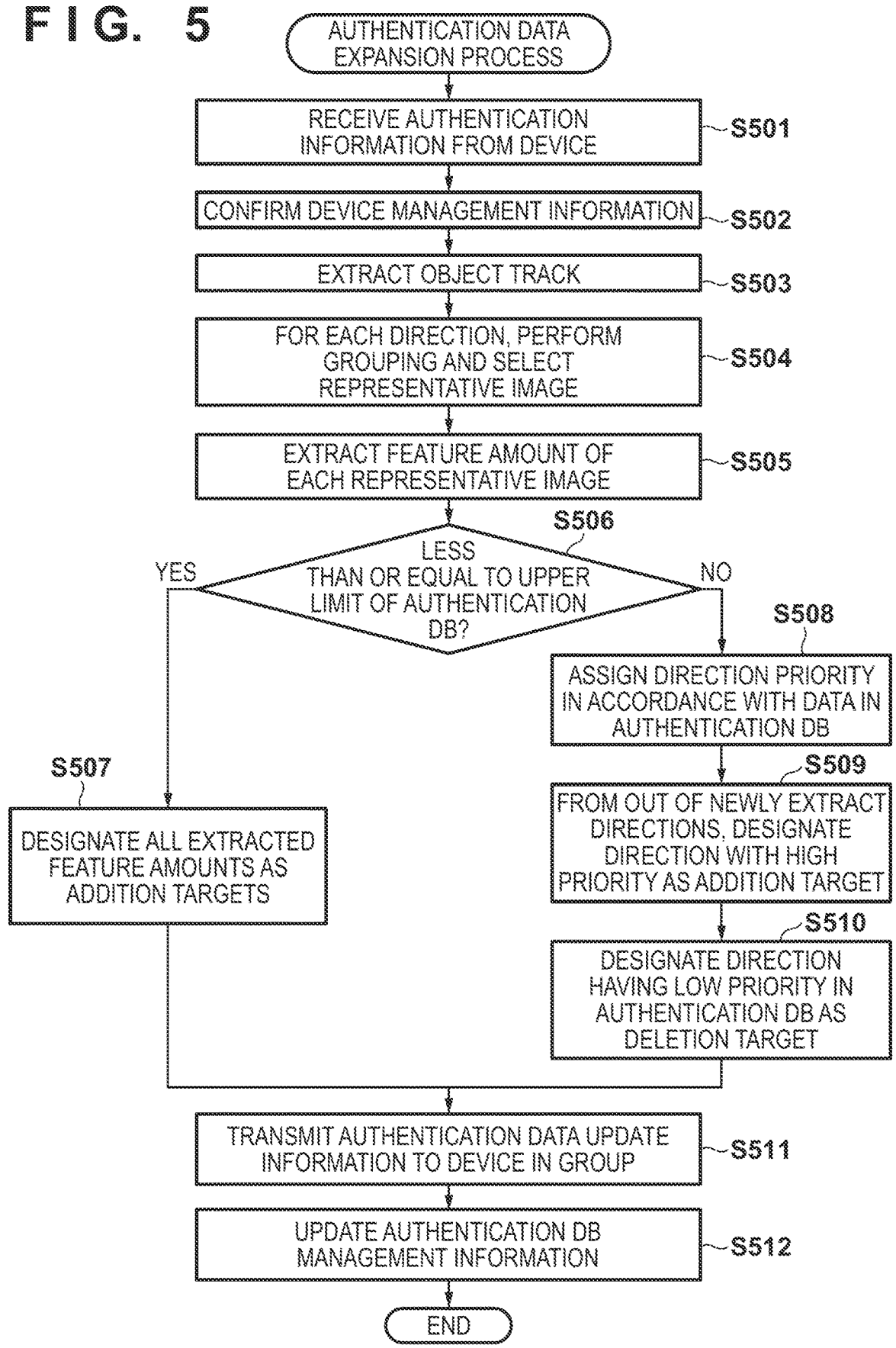
FIG. 5 is a flow chart of an authentication data expansion process.

FIG. 5 is a flow chart of an authentication data expansion process. This process is executed by the update information generation unit 112 of the analysis server 119, and is executed when authentication information is received from the image capturing device 118. More specifically, additional authentication data having a face direction (direction) different from authentication data used at the time of authentication in the image capturing device 118 is generated for an object authenticated by the image capturing device 118.

In step S501, the update information generation unit 112 receives the authentication information from the image capturing device 118. That is, the authentication information transmitted by the image capturing device 118 in step S407 described above is received. In the above step S407, it is assumed that frame images transmitted by the image capturing device 118 are separately received and stored in the analysis server 119 (for example, in the storage unit 114).

In step S502, the update information generation unit 112 refers to the device management information 121, and specifies a group from the camera ID assigned to the authentication information using the group management information illustrated in FIG. 3B. Further, with respect to the objects authenticated by the image capturing device 118, the update information generation unit 112 obtains the direction (face direction) of the authentication data stored in the authentication DB 120 of the specified group, using the authentication DB management information illustrated in FIG. 3C.

In step S503, the update information generation unit 112 tracks and extracts the same object using a group of frame images at a plurality of times that is stored in the analysis server 119. Here, a person region of the person authenticated using the person tracking technique is specified in another frame, and a face region is extracted from the person region.

In relation to a person tracking process, for example, a technique disclosed in Japanese Patent Laid-Open No. 2002-373332 (hereinafter referred to as PTL 4) can be used. In PTL 4, a search position in a next frame is estimated using a detection position of a person in a certain frame, and tracking is performed by template matching. Here, since the position of an authenticated object in an image is included in authentication information, the object can be tracked across preceding/subsequent frames with reference to the position.

In step S504, the update information generation unit 112 determines the face direction of the images of the plurality of face regions that have been tracked and extracted, and performs grouping for each face direction. As a method of detecting the face direction of a person from images, for example, a technique disclosed in "Erik Murphy-Chutorian, "Head pose estimation for driver assistance systems: A robust algorithm and experimental evaluation", in Proc. IEEE Conf. Intelligent Transportation Systems, 2007, pp. 709-714" (hereinafter referred to as NPL 2) can be used.

Further, a representative face region image is selected from a face image group of a person for which tracking and extraction has been performed. For example, it is possible to select an image of a face region of a large size for each direction (for example, for each 300 range) as a representative image of the direction. In addition, the representative image may be selected considering blurring, eye-closing, mouth-opening, and accessories (glasses, sunglasses, mask, hat, and the like), and may be selected by a comprehensive determination based on a combination of one or more of these.

In step S505, the update information generation unit 112 extracts a feature amount from the representative image selected for each face direction (direction). More specifically, the feature amount of the representative image for a direction in which additional expansion is necessary is extracted. By extracting the feature amounts of the representative images in the directions that are not stored in the current authentication DB 120, authentication data for the directions for which authentication by the current authentication DB 120 is difficult can be expanded.

In step S506, when one or more feature amounts extracted in step S505 are added to the authentication DB 120, the update information generation unit 112 determines whether the number of feature amounts in the authentication DB 120 is equal to or less than a predetermined upper limit value. If the number is less than or equal to an upper limit value, the process proceeds to step S507. In contrast, when it is determined that the upper limit value is exceeded, the process proceeds to step S508.

As described above, since the authentication DB 120 is used in the image capturing device 118, if the number of stored feature amounts is too large, time for executing the authentication process becomes long, and it ceases to be possible to perform this process in real time. For this reason, an upper limit value is set in advance for the number of feature amounts stored in the authentication DB 120.

In step S507, the update information generation unit 112 generates update information that designates all the feature amounts extracted in step S505 as addition targets.

In step S508, the update information generation unit 112 assigns priorities to the feature amount of the representative image extracted in step S505 and feature amounts that are registered in the authentication DB. Here, priorities can be assigned to objects to be processed so that the variances of the directions of the representative images selected in step S504 and the feature amounts in the authentication DB increases. For example, by making divisions by the similarity of directions, and by selecting one direction for each division and sequentially assigning a priority, it is possible to increase the variance of directions in the case of selecting something having a high priority. Finally, the number of feature amounts that fall within the upper limit in the authentication DB are selected in descending order of priority.

When a plurality of persons are authenticated at the same time, there is a high possibility that it will be determined in step S506 that the upper limit is exceeded. Therefore, it is necessary to control the number of pieces of additional authentication data among a plurality of objects. In order to solve this problem, configuration may be taken to, in step S508, assign priorities not only to objects currently being processed but also to all objects in the authentication DB. For example, by assigning priorities to the number of pieces of additional authentication data for each object to be as uniform as possible, it is possible to guarantee the diversity of objects in the additional authentication data. When there is a difference in the importance of persons to be authenticated, the priority may be controlled using the importance. By raising the priority of the authentication data of a person with high importance, it is possible to prioritize the authentication accuracy for the important person.

Further, correction may be performed so that the priority of an object whose authenticated time is most recent is higher. In this case, it is possible to increase an amount of authentication data for a person whose appearance has a higher occurrence probability.

In step S509, the update information generation unit 112 designates, as an addition target, a feature amount selected in accordance with the priorities in step S508 among the feature amounts extracted in step S505. That is, additional designation is performed in descending order of feature amounts having a relatively high priority. In step S510, the update information generation unit 112 designates, as a deletion target, a feature amount of a low priority direction that was not selected in step S508, from among feature amounts in the authentication DB. Then, update information corresponding to the designations in step S509 and step S510 is generated.

In step S511, the update information generation unit 112 transmits the generated update information to the plurality of image capturing device 118 that are in the same group. In step S512, the update information generation unit 112 updates the authentication DB management information illustrated in FIG. 3C in accordance with the generated update information.

As described above, it is assumed that the authentication data expansion process is executed when authentication information is received from an image capturing device 118. However, instead of performing the process immediately after the authentication information is received, the process may be performed after a predetermined period of time has elapsed since the authentication information was received. This is because the number of frames to be tracked increases after a certain period of time has elapsed from immediately after authentication, and it is possible to have far greater variation of the face direction. Configuration may be taken such that the process is executed both immediately after the authentication information is received, and also after a predetermined period of time has elapsed since the authentication information was received.

In the above description, the human body tracking technique is used as the expansion method of the face direction data, but the method of expanding the face direction data is not limited to this. For example, configuration may be taken such that a large-scale DB (not illustrated) storing images of various face directions of a person to be authenticated is prepared, and the analysis server 119 accesses the large-scale DB to obtain an image of a face direction different from that at the time of authentication of the person to be authenticated. In addition, by using a technique of expanding a two-dimensional image to a three-dimensional model of a face, an image with a different face direction may be generated from face image data at the time of authentication.

FIG. 6 is a flow chart of an authentication data updating process. This processing is executed in the updating unit 105 of the image capturing device 118. More specifically, the process is executed when the image capturing device 118 receives update information from the analysis server 119.

In step S601, the updating unit 105 receives update information from the analysis server 119. In step S602, the updating unit 105 deletes, from the authentication DB 120, a feature amount recorded as a deletion target in the update information. In step S603, the updating unit 105 adds, from the authentication DB 120, a feature amount recorded as an addition target in the update information.

Further, configuration may be taken to delete the authentication data of an object for whom the probability that an appearance will occur has become low. For example, if a target is a wanted person, they will cease to appear on an surveillance camera after being arrested. In addition, when a target is an important person of an event, the probability of the target appearing after the end of the event period is low. In such a case, a user manually designates an object having a low appearance occurrence probability via the input unit 115 of the analysis server 119. Thus, the deletion of the feature amount of the designated object can be set in the update information and transmitted to one or more image capturing devices 118 included in the same group.

Of course, it is also possible to configure to automatically determine an object whose appearance occurrence probability has become low, instead of manually designating an object. For example, when the timetable for events is known, the appearance occurrence probability may be lowered after an event in which an important person participates is completed.

In addition, it is possible to configure so that the appearance occurrence probability is based on a motion prediction of a person or a physical object in time and space. As an example of a movement prediction method, it is possible to perform prediction by measuring a movement trajectory of a person from a video and extracting a main movement pattern. Based on the predicted trajectory, in step SS11, the analysis server 204 can determine an order in which the authentication data update information is transmitted to the plurality of image capturing devices 118 in the same group. For example, configuration is taken such that, with respect to from the start to the end of the predicted movement trajectory, the authentication data update information is transmitted earlier to an image capturing device 118 closer to the start of the movement trajectory. This is because it is considered that the closer an image capturing device 118 is to the start of the movement trajectory, the earlier it is in an order of capturing the target person. Further, in the case where an authentication target is a wanted person, the appearance occurrence probability may be lowered if they are arrested. Automation can be performed so as to determine that an arrest has been made when a video is analyzed and movement characteristic of an arrest is detected.

At a time of deleting feature amounts, configuration may be taken to keep a feature amount for a basic direction (for example, the front direction), instead of deleting feature amounts for all directions. In addition, configuration may be taken to manage this together with information for determining whether this is for a feature amount that was originally stored or for a feature amount added later in accordance with update information, and perform deletion by specifying an added feature amount.

Alternatively, configuration may be taken to manage the update date and time of each feature amount of the authentication data, and delete a feature amount having an old update date and time. Thereby, when a feature of the same person changes due to the passage of time, it is possible to make a replacement by prioritizing a newer feature amount.

Note that, in the above explanation, it is assumed that whether or not to store a feature amount is managed for each direction in the authentication DB management information illustrated in FIG. 3C. Configuration may be taken to, however, manage the number of stored images (a registered number) instead of whether or not to store the images, and to select a representative image of a direction where there is a smaller number of stored images in step S505 of FIG. 5.

In the above description, a case where only one analysis server 119 is installed is assumed, but a plurality of analysis servers 119 may be installed. In this case, each image capturing device 118 is associated with one analysis server 119 in advance, and video data and authentication information are transmitted to the associated analysis server 119. Note that a group for classifying nearby image capturing devices 118 with one another can be set independently of the correspondence between the image capturing device 118 and the analysis server 119. For example, a plurality of image capturing devices 118 for which one analysis server 119 is responsible for processing may be part of one group, and may be configured of a plurality of groups. The authentication DB management information (FIG. 3C) and the group management information (FIG. 3B) on the analysis server 119 are managed in accordance with information of all the image capturing devices 118, and the analysis server 119 can transmit update information to any image capturing device 118.

Furthermore, the division of processing between the image capturing device 118 and the analysis server 119 is not limited to the form described above. For example, although the object authentication process is performed by the image capturing device 118 in the above description, configuration may be taken such that the image capturing device 118 only has the image capturing unit 108. In such a case, the extraction unit 103, the authentication unit 104, the updating unit 105, and the authentication DB 120 may be arranged in another server (authentication server) (not illustrated). In this case, the image capturing device 118 sends the captured video to the authentication server, the object authentication process illustrated in FIG. 4 is performed by the authentication server, and then the information is transmitted to the analysis server. The analysis server performs the authentication data expansion processing illustrated in FIG. 5, and finally the authentication server performs the authentication data updating process illustrated in FIG. 6. In addition, configuration may be taken to combine the above authentication server and analysis server as a single server. In this case, an authentication DB 120 is held in the analysis server 119, and the object authentication process is performed by the analysis server 119. By virtue of this configuration, because it is unnecessary to transmit the update information generated by the analysis server 119 to the image capturing device 118, the amount of communication can be reduced.

By virtue of the first embodiment as described above, in the authentication system, the analysis server additionally expands authentication data of a face direction that is not in the initial authentication DB. With this configuration, it is possible to efficiently improve authentication accuracy for various face directions of persons who have a high likelihood to appear in a respective image capturing device in the future. In particular, by dynamically expanding authentication data suitable for each image capturing device in consideration of capturing conditions of each image capturing device, face authentication processing can be performed in real time even in a low resource environment such as an image capturing device.

Second Embodiment

As a second embodiment of an image processing apparatus according to the present invention, similarly to in the first embodiment, description is given below by taking as an example an authentication system for authenticating a person (object) in a video by a face image. In the first embodiment described above, a plurality of image capturing devices 118 are grouped, and the same authentication DB 120 is used in the group. However, even within the same group, there are cases in which a face direction that is likely to appear differs for each image capturing device 118. Therefore, in the second embodiment, the authentication data is separately expanded for the authentication DB of each image capturing device.

<System Configuration>

Figure 7A:
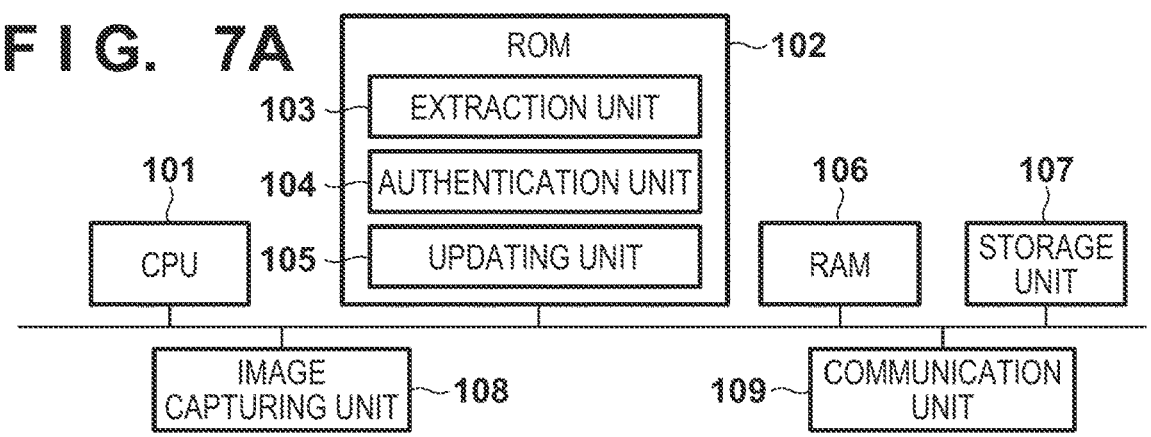
FIGS. 7A to 7C are views illustrating a configuration of apparatuses included in an authentication system according to a second embodiment.
Figure 7B:
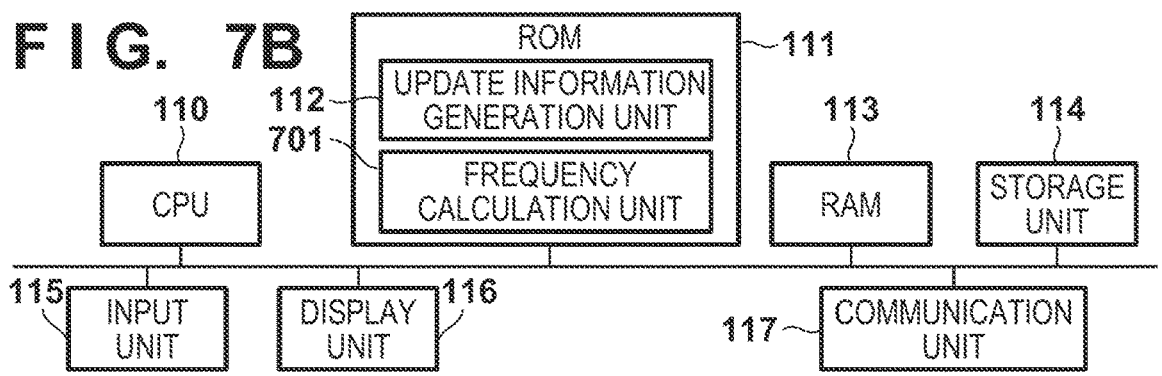
Figure 7C:
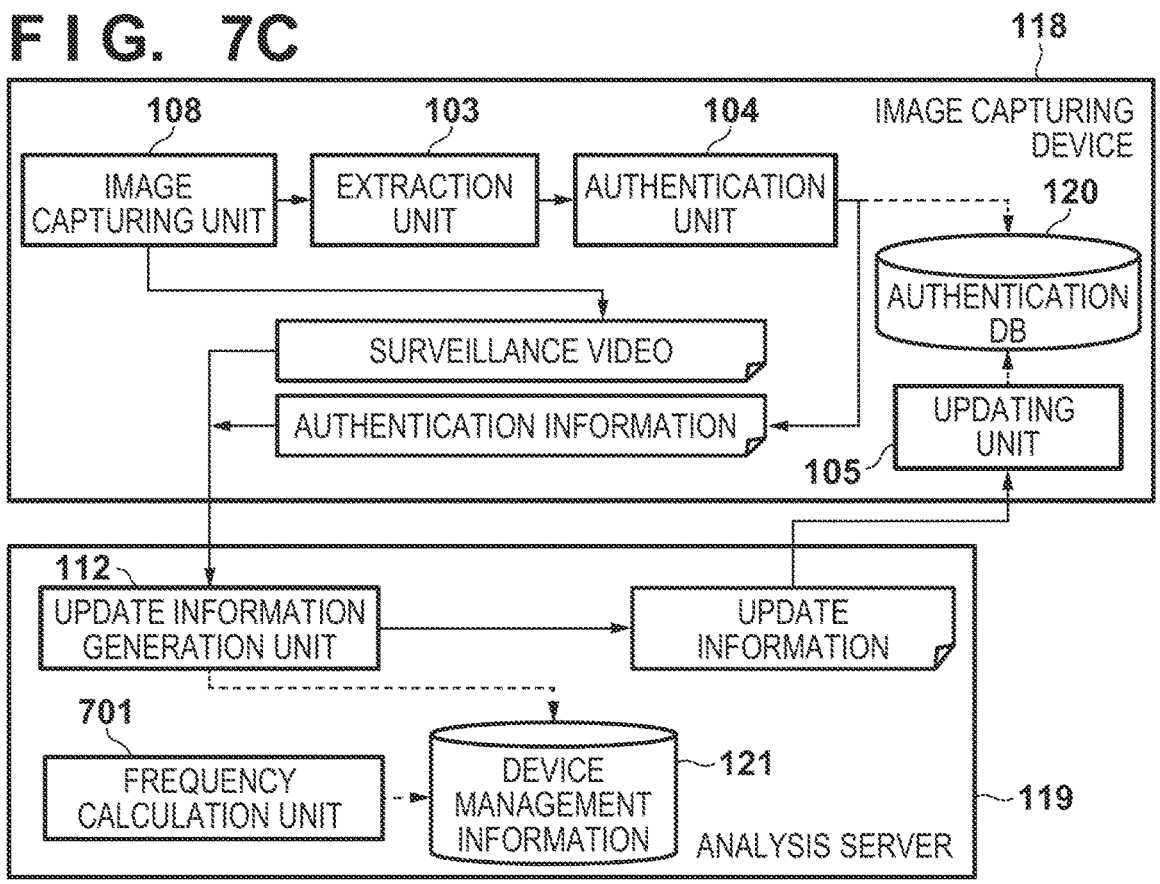

FIGS. 7A to 7C are views illustrating a configuration of apparatuses included in an authentication system according to a second embodiment. FIG. 7A illustrates a hardware configuration of the image capturing device, and FIG. 7B illustrates a hardware configuration of the analysis server. FIG. 7C illustrates a software configuration of the image capturing device and a software configuration of the analysis server. Hereafter, description will mainly be given of portions different from those of the first embodiment, and description of the same functional configuration will be omitted.

The ROM 102 in the analysis server 119 further stores a control program for realizing a frequency calculation unit 701. The frequency calculation unit 701 is a functional unit that calculates the direction of an object that is likely to appear for each image capturing device 118, and records information thereof in the device management information 121.

<Overview of Authentication Data Updating Process>

FIG. 8A is a view illustrating an outline of an authentication data updating process according to the second embodiment. Here, similarly to in the first embodiment, a state where a system is configured by three image capturing devices 201 to 203 installed nearby and one analysis server 204 is envisioned. However, as described above, there is a difference from the first embodiment in that the authentication data is separately updated for each authentication DB.

It is assumed that FIG. 8B is an initial state of the authentication DB 120, and the authentication DBs 120 of the image capturing devices 201 to 203 have a common initial state. In the initial state, feature amounts of limited face directions are stored, and in this example, the feature amounts of the front faces of a person A, a person B, and a person C are stored as the feature amounts 206 to 208.

In FIG. 8A, a case where the image capturing devices 201 capture the person B and authenticate the front face of the person B is considered. The image capturing device 201 transmits the authentication information of the person B to the analysis server 204. The analysis server 204 obtains a feature amount of a face direction different from that at the time of authentication for the person B. In this case, feature amounts of face directions other than the front face are obtained from a series of data (a person track) obtained by tracking the authenticated person B. Then, the analysis server 204 generates update information 801 to 803 for updating the authentication data of the person B. The update information 801 to 803 are obtained by selecting authentication data of a direction (face direction) that is likely to appear in each of the image capturing devices 201 to 203. For example, in the case where a face of a somewhat rightward direction is likely to appear in the image capturing device 202, update information 802 to which a face of a somewhat rightward direction is added is generated for the image capturing device 202.

The analysis server 204 transmits the generated update information 801 to 803 the image capturing devices 201 to 203, respectively. Each of the image capturing devices 201 to 203 receives the update information, and adds the feature amount to the authentication DB in each apparatus in accordance with the update information.

FIGS. 8C to 8E illustrate the states of the authentication DBs after the update information is reflected in the image capturing devices 201 to 203, respectively. A feature amount 804, a feature amount 805, and a feature amount 806 which do not exist in the initial state have been added for the person B.

As a result, regarding the person B who is captured by the image capturing device 201 and has a high likelihood of being captured by the image capturing device 202 and the image capturing device 203 at a time difference, it is possible to expand the authentication data for directions in which capturing by respective apparatuses is likely to occur. Even in a case where capturing is performed with a face direction different from a face direction registered in the initial state, authentication of an important person can be performed with high accuracy.

FIGS. 9A and 9B are views for explaining various data used in an authentication system. FIG. 9A is a table for managing the authentication DB 120 in an image capturing device. Here, since the authentication DBs differ for each image capturing device 118, for each camera ID 304, it is managed, for each object ID 301, for which direction a feature amount is recorded in the authentication DB 120.

FIG. 9B is a table for managing information of directions (a capturing frequency for each direction) for which a target is likely to appear in each image capturing device 118. For each camera ID 304, a computation duration 901 and a frequency 902 are recorded. For example, the number of captures of a face direction is measured at predetermined time intervals, and the number of captures can be recorded as the frequency 902.

<Detailed Operation of Each Apparatus>

Hereinafter, a face direction frequency calculation process in the analysis server and an authentication data expansion process in the analysis server will be described in more detail. Since the object authentication processing in the image capturing device and the authentication data updating process in the image capturing device are similar to those in the first embodiment, description thereof is omitted.

FIG. 10 is a flow chart of a face direction frequency calculation process. This process is executed by the frequency calculation unit 701 of the analysis server 119.

In step S1001, the analysis server 119 receives a frame image from the image capturing device 118. In step S1002, the analysis server 119 extracts objects from the received frame image. Here, face regions are extracted.

In step S1003, the analysis server 119 determines the directions of the faces in images of the extracted face regions. As for a method of extracting the face region of a person from an image and a method of determining the face direction, the techniques illustrated in NPL 1 and NPL 2 can be used as in the first embodiment. In step S1004, the analysis server 119 updates the frequency information illustrated in FIG. 9B. More specifically, face direction information determined this time is added to the column of the frequency 902 corresponding to the current period 901.

In step S1005, the analysis server 119 determines whether or not the frequency information includes information that is as old as a predetermined amount of time or more. If it is determined that there is old information, the process proceeds to step S1006. When it is determined that there is no old information, this process is terminated. In step S1006, the analysis server 119 terminates this process after deleting the frequency information determined to be as old as the predetermined amount of time or more. By deleting information that is as old as the predetermined amount of time or more in this manner, it is possible to keep only frequency information suitable for the latest situation.

Next, changes in the processing of the update information generation unit 112 in the second embodiment will be described. In the second embodiment, in step S502, regarding an authenticated object, the authentication DB management information indicated in FIG. 9A is used to obtain, for each image capturing device 118 in the group, the directions of the authentication data stored in the authentication DB 120 of the image capturing device 118.

Further, in step S505, for each image capturing device 118 in the group, the frequency information of FIG. 9B is referred to, and a direction (face direction) that is likely to appear is determined. As an example, a direction that is likely to appear can be obtained as a ratio of the frequency of each direction to the frequency of all directions (an occurrence probability). A direction that is likely to appear in each image capturing device 118 and the directions of the authentication data in the authentication DB 120 are compared, and, a direction for which a feature amount is not stored in the authentication DB 120, despite having greater than or equal to a predetermined likelihood of appearance, is selected as a direction for which expansion is necessary. It is assumed that the process after step S506 is similarly performed for each of the image capturing device 118.

By virtue of the second embodiment as described above, in the authentication system, the analysis server additionally expands authentication data of a face direction that is not in the initial authentication DB. In particular, a direction that is likely to appear in each image capturing device is calculated, and the authentication DB of each image capturing device is separately updated. With this configuration, it is possible to efficiently improve authentication accuracy for various face directions of persons that are highly likely to appear in a respective image capturing device in the future.

Frequency information may be applied to a difference in capturing condition other than the face direction. In addition, for a method of determining the face direction, configuration may be taken to make a calculation from a flow amount of the movement trajectory of a person in an obtained video by using a person tracking technique, in addition to counting the number of occurrences of a face direction. For example, it is possible to determine that the appearance occurrence probability of a front face is high when many movement trajectories flow from the top in a downward direction, and the appearance probability of a leftward orientated face profile is high when many movement trajectories flow from left to right.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-182700, filed on Sep. 27, 2018, which is hereby incorporated by reference herein in its entirety.

What is claimed is:

1. An information processing apparatus operable to connect via a network to a plurality of authentication apparatuses corresponding to a plurality of image capturing apparatuses, the information processing apparatus comprising:
    an authentication data generation unit configured to generate authentication data that can be used for authentication of a first object that is included in a captured image captured by a first image capturing apparatus included in the plurality of image capturing apparatuses and has been authenticated by a first authentication apparatus corresponding to the first image capturing apparatus; and
    a reflection unit configured to cause the authentication data generated by the authentication data generation unit to be reflected to an authentication database (DB) of at least one authentication apparatus included in the plurality of authentication apparatuses,
    wherein
    the authentication data generation unit generates second authentication data corresponding to a second capturing condition differing from a first capturing condition corresponding to first authentication data that is included in the authentication DB of the first authentication apparatus and was used when authenticating the first object.

2. The information processing apparatus according to claim 1, wherein
    the authentication data generation unit generates the second authentication data by selecting an image corresponding to the second capturing condition from an image group obtained by tracking the first object in relation to a plurality of captured images obtained by the first image capturing apparatus.

3. The information processing apparatus according to claim 2, further comprising:
    a calculation unit configured to calculate an occurrence probability of a capturing condition of an object in a plurality of captured images obtained by the first image capturing apparatus,
    wherein the authentication data generation unit determines the second capturing condition based on the occurrence probability calculated by the calculation unit.

4. The information processing apparatus according to claim 1, wherein
    the authentication data generation unit further generates third authentication data corresponding to a third capturing condition different from the first capturing condition and the second capturing condition.

5. The information processing apparatus according to claim 1, wherein
the capturing conditions include at least one of an object being captured in a direction, the presence of an accessory of an object, and an illumination condition.

6. The information processing apparatus according to claim 1, wherein
the object is a face image of a person, and
the authentication data included in the authentication DB is a feature amount of the face image.

7. The information processing apparatus according to claim 1, wherein
so that a variance of a capturing condition in a plurality of pieces of authentication data to be included in the authentication DB increases, the reflection unit causes the authentication DB of the at least one authentication apparatus included in the plurality of authentication apparatuses to reflect the authentication data generated by the authentication data generation unit.

8. The information processing apparatus according to claim 1, further comprising:
an assigning unit configured to assign a priority to one or more pieces of authentication data generated by the authentication data generation unit,
wherein the reflection unit causes the authentication DB of the at least one authentication apparatus included in the plurality of authentication apparatuses to reflect authentication data having a relatively high priority.

9. The information processing apparatus according to claim 1, wherein
the reflection unit further deletes one or more pieces of authentication data included in the authentication DB if the number of pieces of authentication data included in the authentication DB exceeds a predetermined upper limit due to reflection of authentication data.

10. The information processing apparatus according to claim 1, wherein
the reflection unit predicts a movement trajectory of the first object, and determines, based on the movement trajectory, an order of authentication DBs in which authentication data is caused to be reflected.

11. The information processing apparatus according to claim 1, wherein
each of the plurality of image capturing apparatuses and a corresponding authentication apparatus are configured as an integrated apparatus.

12. A method of controlling an information processing apparatus connected via a network to a plurality of authentication apparatuses corresponding to a plurality of image capturing apparatuses, the method comprising:
generating authentication data that can be used for authentication of a first object that is included in a captured image captured by a first image capturing apparatus included in the plurality of image capturing apparatuses and is authenticated by a first authentication apparatus corresponding to the first image capturing apparatus; and
causing the generated authentication data to be reflected to an authentication DB of at least one authentication apparatus included in the plurality of authentication apparatuses,
wherein
in the generating, second authentication data corresponding to a second capturing condition differing from a first capturing condition corresponding to first authentication data that is included in the authentication DB of the first authentication apparatus and was used when authenticating the first object is generated.

13. A non-transitory computer-readable recording medium storing a program that causes a computer to function as an information processing apparatus operable to connect via a network to a plurality of authentication apparatuses corresponding to a plurality of image capturing apparatuses, the information processing apparatus comprising:
an authentication data generation unit configured to generate authentication data that can be used for authentication of a first object that is included in a captured image captured by a first image capturing apparatus included in the plurality of image capturing apparatuses and has been authenticated by a first authentication apparatus corresponding to the first image capturing apparatus; and
a reflection unit configured to cause the authentication data generated by the authentication data generation unit to be reflected to an authentication database (DB) of at least one authentication apparatus included in the plurality of authentication apparatuses,
wherein
the authentication data generation unit generates second authentication data corresponding to a second capturing condition differing from a first capturing condition corresponding to first authentication data that is included in the authentication DB of the first authentication apparatus and was used when authenticating the first object.

14. An authentication system comprising:
a plurality of image capturing units;
a plurality of authentication units corresponding to the plurality of image capturing units, each of the plurality of authentication units configured to authenticate, based on a respective authentication DB, an object included in a captured image obtained by a corresponding image capturing unit;
an authentication data generation unit configured to generate authentication data that can be used for authentication of a first object that is included in a captured image captured by a first image capturing unit included in the plurality of image capturing units and is authenticated by a first authentication unit corresponding to the first image capturing unit; and
a reflection unit configured to cause the authentication data generated by the authentication data generation unit to be reflected to an authentication DB of at least one authentication unit included in the plurality of authentication units,
wherein
the authentication data generation unit generates second authentication data corresponding to a second capturing condition differing from a first capturing condition corresponding to first authentication data that is included in the authentication DB of the first authentication unit and was used when authenticating the first object.

15. A method of controlling an authentication system, wherein
the authentication system comprises:
a plurality of image capturing units;
a plurality of authentication units corresponding to the plurality of image capturing units, each of the plurality of authentication units configured to authenticate, based on a respective authentication DB, an object included in a captured image obtained by a corresponding image capturing unit; and the method comprises:

generating authentication data that can be used for authentication of a first object that is included in a captured image captured by a first image capturing unit included in the plurality of image capturing units and is authenticated by a first authentication unit corresponding to the first image capturing unit; and causing the generated authentication data to be reflected to an authentication DB of at least one authentication unit included in the plurality of authentication units, wherein in the generating, second authentication data corresponding to a second capturing condition differing from a first capturing condition corresponding to first authentication data that is included in the authentication DB of the first authentication unit and was used when authenticating the first object is generated.

16. An information processing apparatus communicably connected to a plurality of image capturing apparatuses via a network, comprising:

an authentication data generation unit configured to generate authentication data that can be used for authentication of an object that is included in a captured image captured by a first image capturing apparatus included in the plurality of image capturing apparatuses and is authenticated by a first authentication unit that the first image capturing apparatus has; and a reflection unit configured to cause the authentication data generated by the authentication data generation unit to be reflected to an authentication database that stores the authentication data and is a storage unit held by at least one image capturing apparatus included in the plurality of image capturing apparatuses and different to the first image capturing apparatus, wherein the authentication data generation unit generates second authentication data corresponding to a second condition different from a first condition corresponding to first authentication data that has been registered in the authentication database of the first image capturing apparatus and was used when authenticating the object.

17. The information processing apparatus according to claim 16, wherein the authentication data generation unit generates the second authentication data by selecting an image corresponding to the second condition from an image group obtained by tracking the object in relation to a plurality of captured images obtained by the first image capturing apparatus.

18. The information processing apparatus according to claim 16, wherein the object is a face image of a person, and the authentication data generation unit generates, from an image group obtained by tracking a region of the face, the second authentication data corresponding to a face direction which is not authenticated by the authentication data used for the authentication by the first authentication unit.

19. A method of controlling an information processing apparatus communicably connected to a plurality of image capturing apparatuses via a network, the method comprising:

generating authentication data that can be used for authentication of an object that is included in a captured image captured by a first image capturing apparatus included in the plurality of image capturing apparatuses and is authenticated by a first authentication unit that the first image capturing apparatus has; and causing the authentication data generated by the authentication data generation unit to be reflected to an authentication database that stores the authentication data and is a storage unit held by at least one image capturing apparatus included in the plurality of image capturing apparatuses and different to the first image capturing apparatus, wherein, in the generating, second authentication data corresponding to a second condition different from a first condition corresponding to first authentication data that has been registered in the authentication database of the first image capturing apparatus and was used when authenticating the object is generated.

20. A non-transitory computer-readable recording medium storing a program that causes a computer to function as an information processing apparatus communicably connected to a plurality of image capturing apparatuses via a network, comprising:

an authentication data generation unit configured to generate authentication data that can be used for authentication of an object that is included in a captured image captured by a first image capturing apparatus included in the plurality of image capturing apparatuses and is authenticated by a first authentication unit that the first image capturing apparatus has; and a reflection unit configured to cause the authentication data generated by the authentication data generation unit to be reflected to an authentication database that stores the authentication data and is a storage unit held by at least one image capturing apparatus included in the plurality of image capturing apparatuses and different to the first image capturing apparatus, wherein the authentication data generation unit generates second authentication data corresponding to a second condition different from a first condition corresponding to first authentication data that has been registered in the authentication database of the first image capturing apparatus and was used when authenticating the object.

* * * * *